May 28, 1957 — O. H. BANKER — 2,793,498
HYDRAULIC SYSTEM AND UNLOADER VALVE THEREFOR
Filed Aug. 29, 1955

INVENTOR.
Oscar H. Banker
BY
Charles J. Vryted
Attorney

United States Patent Office 2,793,498
Patented May 28, 1957

2,793,498

HYDRAULIC SYSTEM AND UNLOADER VALVE THEREFOR

Oscar H. Banker, Evanston, Ill., assignor to New Products Corporation, Skokie, Ill., a corporation of Delaware Application August 29, 1955, Serial No. 531,154

8 Claims. (Cl. 60—51)

This invention relates to a system for operating hydraulic devices and to an unloader valve to be used in such system.

In my copending application Serial No. 510,105, filed May 23, 1955, for Unloader Valve, there is disclosed an unloader valve the construction of which is such as to require a minimum of expensive machining operations for its construction. Thus, the majority of the parts used therein are screw machine parts, and the valve, in one form, has all of the principal parts thereof concentrically arranged so that a throughbore may be formed in the valve housing in which various counterbores may be made for the reception of the concentrically arranged valve parts.

The present invention has for its general object the improvement of the valve in my aforesaid pending application with a view to simplifying still further the construction thereof while still retaining the concentric arrangement and throughbore construction of the valve.

Another object of this invention is the provision of an unloader valve of the type disclosed in my aforesaid application wherein an improved dash-pot action is secured to prevent an overly rapid and destructive opening of the unloader portion of the valve.

Yet another feature of this invention is the provision of an unloader valve having two exhaust or vent openings, and the provision of a hydraulic system to take advantage of the double vent opening construction of the unloader valve.

In my copending application Serial No. 530,703, filed August 26, 1955, there is disclosed a valve for controlling the operation of a hydraulic cylinder, said valve being of the closed center type such that when neither side of the cylinder is working, no fluid flows through the valve, thereby permitting pressure to be maintained at all times in the system, or branch of the system, to which the valve is connected. Such closed center valve may be used with a system including an accumulator and an unloader valve for charging the accumulator, and other hydraulic devices requiring a substantially constant source of fluid under pressure. There are other devices, however, which are adapted for use with an open center valve and such devices ordinarily cannot be used with the aforementioned system since the open center valve would at all times dump the pressure in the system and thereby prevent the operation of those devices which require a nearly constant supply of fluid under pressure.

A further object of this invention is the provision of a hydraulic system incorporating an accumulator and an unloader valve wherein devices controlled by both open and closed center valves may be utilized.

A further object of this invention is the provision of an unloader valve having two exhaust or vent outlets, one of which may be connected to one or more devices controlled by open center valves and the other of which is permanently and directly connected to either the reservoir or to the intake of the pump for the system, such that operation of the device controlled by the open center valve may take place without affecting in any way the fluid in the accumulator so that said fluid is instantly available for the operation of other devices in the system which may require a relatively constant source of fluid under pressure.

These and other objects of this invention will become apparent from the following detailed description when taken together with the accompanying drawings in which.

For a logical presentation of this invention the valve will be described first, followed by a description of a system in which the valve may be used.

Figures 2, 3:
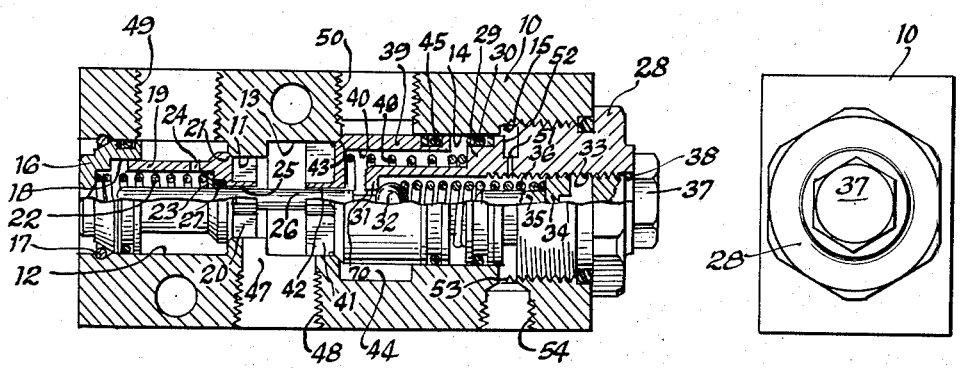
Fig. 2 is a cross sectional view through the unloader valve of this system showing the parts thereof in the position they would occupy when the pump is not running.
Fig. 3 is an end elevational view of the valve of Fig. 2 looking from the right-hand side thereof.
Figure 4:
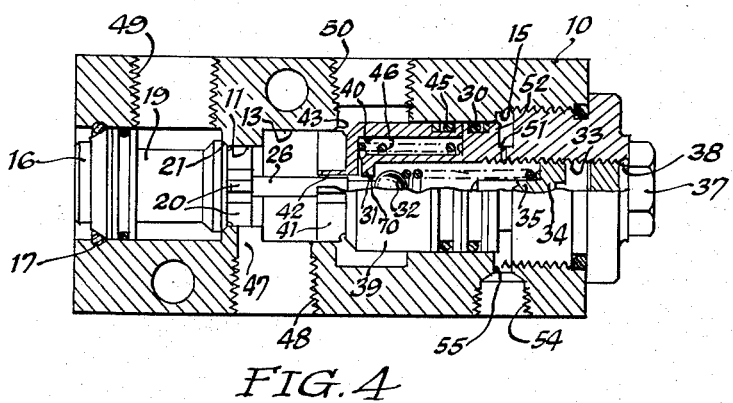
Fig. 4 is a cross sectional view, similar to that of Fig. 2, of the valve showing the parts thereof in the position they occupy when the accumulator is satisfied and the valve is unloading.

Referring now to Fig. 2, the valve is comprised of a housing 10, which may be of rectangular or block form, and having a throughbore 11 disposed centrally therein and concentrically with respect to the long axis of housing 10. Said throughbore 11 has a counterbore 12 formed on the left-hand side thereof and a series of progressively larger counterbores 13, 14 and 15 formed on the right-hand side thereof, all as viewed in Fig. 2.

Within counterbore 12 is disposed a plug 16 held against outward movement by a snap ring 17 and having a recess 18 to receive one end of an accumulator valve 19 axially reciprocable in said recess and in throughbore 11. The right-hand end of valve 19 as viewed in Fig. 2 is cruciform in cross section to provide suitable means for guiding valve 19 in throughbore 11 and at the same time to provide access for the fluid in said throughbore to the accumulator valve seat 21 disposed in the end of bore 11.

Valve 19 is hollow and is normally urged against seat 21 by a spring 22 compressed between plug 16 and a washer 23 disposed in the interior of valve 19. A radial crossbore 24 establishes hydraulic communication between the interior and exterior of valve 19 so that said valve is also urged by the fluid in the accumulator toward its seat 21.

Valve 19 has an opening 25 through which extends a cylindrical pilot valve pin 26, said pilot valve pin being axially reciprocable in opening 25. A hydraulic seal is effected between the pin and accumulator valve by an O ring 27 received in a counterbore in valve 19 and held therein by washer 23. It may be noted that the left-hand end of pilot valve pin 26, as viewed in Fig. 2, is fully exposed to the pressure in the accumulator and that therefore the pilot valve pin will be urged by such accumulator pressure to the right as viewed in Fig. 2.

Counterbore 15 is closed by a hollow plug 28 which is threaded into said counterbore 15 and which has a portion 29 of reduced diameter extending into counterbore 14 and sealed with respect thereto by a O ring 30. Beyond portion 29, plug 28 is still further reduced in diameter and terminates in an inwardly extending flange 31, forming on the interior thereof the seat for a ball valve 32 which functions as a pilot valve. The central region of plug 28 is made hollow by a recess 33 which is threaded over the righthand portion thereof as shown in Fig. 2 to receive an adjusting nut 34 having a relatively long shank 35 for centering a compression spring 36. Said spring 36 serves to hold ball 32 on its seat against the pump pressure as will be hereinafter described in detail. The pressure provided by spring 36 may be varied by rotating nut 34 in the desired direction. The setting of the nut 34 is protected by a third plug 37 which may be screwed into recess 33 and made fluid tight with respect thereto by an O ring or packing 38. The setting of nut 34 may be readily changed or adjusted while the valve is in operation.

The vent means of the unloader valve is shown at 39 and is comprised of a cylinder having a recess 40, a cruciform guide 41 extending into counterbore 13, and a central opening 42 through which pilot valve pin 26 extends. Opening 42 is of slightly greater diameter than the diameter of pilot valve pin 26 so that fluid may normally pass between the pin and vent valve into recess 40. Since counterbore 14 is larger than counterbore 13, the presence of fluid under the same unit pressure on both sides of valve 39 creates a net effective pressure on the valve in a direction to move the valve to the left as viewed in Fig. 2. A seat 43 is provided for said valve 39, there being a peripheral internal groove 44 formed in counterbore 14 adjacent seat 43 which functions as a collector ring to conduct vented fluid to outlet opening 50 and which serves additionally to give the valve sufficient freedom to seat itself upon said seat 43. An O ring 45 seals valve 39 with respect to counterbore 14. A spring 46 compressed between the bottom of recess 40 and portion 29 of plug 28 urges valve 39 against its seat 43 and functions to close the valve in the absence of fluid pressure.

Throughbore 11 and counterbore 13 are in communication through a radial opening 47 with a pump inlet opening 48 through which fluid under pressure from the pump (to be hereinafter described in connection with Fig. 1) is admitted. Counterbore 12 is connected to an outlet opening 49 connected to an accumulator and groove 44 is connected through opening 50 to a dump or vent passage hereinafter to be described.

Recess 33 in plug 28 is connected through a relatively fine cross bore 51 to a peripheral groove 52 which, in turn, is in communication with a radially extending passage 53 leading to a second vent opening 54.

In operation, fluid under pressure entering throughbore 11 and counterbore 13 from radial opening 47 will exert a pressure upon valve 19 against the resistance of spring 22 to unseat the valve and allow fluid under pressure to pass through accumulator outlet 49 to the accumulator. Said fluid under pressure will also act against vent valve 39 tending to unseat said valve, but because of the clearance between the central opening 42 and pilot valve 26, fluid under pressure will also be admitted into recess 40, i. e., to the opposite side of valve 39 to counteract, with the assistance of spring 46, said unseating pressure. Thus valve 39 will be held closed while valve 19 is open and the accumulator is being filled.

Under the foregoing conditions, viz., while the accumulator is being filled or charged, the chamber defined by valve 39, plug 28 and ball 32 will be sealed by O rings 30 and 45 and will be under the same fluid pressure as the counterbore 13. This pressure will be higher than the pressure in counterbore 12 by the pressure provided by spring 22. Thus, pump pressure will act upon ball 32 in opposition to spring 36 to unseat the ball and vent the chamber so defined. Said pump pressure also acts upon the right-hand side of pilot valve pin 26 to move the pin to the left, since the only resistance to such movement is the accumulator pressure, which is always less than pump pressure, and the frictional resistance of O ring 27.

When the pump pressure reaches a predetermined value calculated to result in the desired upper limit of pressure in the accumulator, ball 32 will be unseated against the action of spring 36, and will over-travel slightly due to the rapidity with which the pressure is built up. The over-travel will result in a momentary lowering of the pressure on the right-hand side of valve 39 as viewed in Fig. 2.

Immediately upon the lowering of the pressure on said right-hand side of valve 39, the pressure on the corresponding side of pin 26 will likewise drop and the pin will move to the right against ball 32 to hold the ball open and thus vent the said right-hand side of valve 39.

Crossbore 51 will meter the vented fluid into groove 52, passage 53 and vent opening 54 at a rate which will prevent a sudden movement of valve 39 against plug 28, but at a higher rate than is permitted by the clearance 42 so that while ball 32 is unseated, the pressure on the right-hand side of valve 39 will be sufficiently lower than the pump pressure to cause the pump pressure to hold valve 39 open.

The venting of the pressure in bore 11 and counterbore 13 by the opening of valve 39 creates an unbalance on accumulator valve 19 in favor of seating said valve upon its seat 21 so that immediately upon the attainment of the predetermined pressure in the accumulator and the subsequent operation of pilot valve 32, valve 19 will close and will maintain the desired pressure in said accumulator.

When the accumulator pressure drops, due to a drain therein by the operation of a hydraulic device connected thereto, to a predetermined lower value, spring 36 will overcome the accumulator pressure on pilot valve pin 26, and cause ball 32 to seat or close. This immediately allows pressure to build up behind valve 39 to seat the latter valve, and upon the attainment of a pressure in bore 11 in excess of the accumulator pressure, valve 19 will open to allow the accumulator to be charged.

It may be noted that by making the diameter of ball valve seat opening 70 equal to, or slightly less than, the diameter of pin 26, the differential in accumulator unit pressure corresponding to the differential in unit pressure between the pressure at which valve 39 opens and closes may be made as low as 10 to 20 pounds per square inch.

Figure 1:
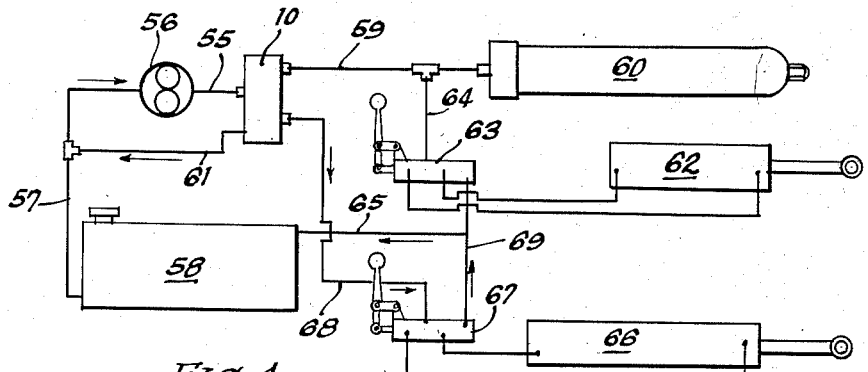
Fig. 1 is a schematic diagram of a hydraulic system incorporating the unloader valve of this invention and showing its connection to both closed center and open center valves.

Referring now to Fig. 1 for a description of a typical system in which the double outlet unloader valve may be used, said valve is shown at 10 having a pipe 55 connected to pump inlet opening 48 at one end and at the other end to the outlet of a pump 56 of any suitable character. Pump 56 in turn is connected through a pipe 57 to a reservoir 58.

The accumulator outlet 49 is connected through a pipe 59 to the accumulator 60 and vent opening 54 is connected through a pipe 61 to pipe 57 and the reservoir 58 and inlet to pump 56.

One or more hydraulic cylinders 62 adapted to perform work of any desired character may be connected to a closed center valve 63 of the type disclosed in my aforesaid pending application Serial No. 530,703, filed August 26, 1955, the valve, in turn, being connected through a pipe 64 to pipe 59 and accumulator 60 or unloader valve 10. As is more fully described in said application, valve 63, when not open to admit fluid to one side or the other of the hydraulic cylinder 62, closes pipe 64 so that there is no drain upon the fluid in accumulator 60 or in pipe 59. When valve 63 is operated, however, the side of the cylinder opposite the working side is vented through a pipe 65 which conducts the vented fluid back to reservoir 58.

The hydraulic system disclosed in Fig. 1 may also include an additional work cylinder 66 of the hydraulic type which may be controlled by a valve 67 of the open center type such as is described in my copending application Serial No. 401,122, filed December 30, 1953, for Power Steering Valve. Valve 67 is connected through a pipe 68 to the outlet opening 50 of valve 10 which, it may be recalled, is the opening through which the fluid under pressure may be vented when the accumulator 60 is satisfied.

The open center valve 67 is of such type that when work cylinder 66 is not operated, that is, when neither side is subjected to fluid under pressure, the valve will vent the fluid in pipe 68 through a pipe 69 connected to pipe 65 and reservoir 58.

The system shown in Fig. 1 thus may include both open center and closed center valves for operating work cylinders, the open center valve being connected to one of the vent openings of the unloader valve 10 and being operative whenever the accumulator is satisfied. By way of example, in one installation a hydraulic front loader-equipped tractor may have hydraulically operated brakes and other devices. The loader may be operated by cylinder 66 controlled by open center valve 67 and the brakes may be operated by cylinder 62 controlled by closed center valve 63. Ordinarily, the tractor will not require the application of its brakes while the loader is in operation, and hence the loader will be supplied with ample fluid under pressure to perform its function. The operation of the loader similarly will not affect the accumulator pressure so that the latter is instantly available to supply fluid under pressure to the brake cylinder or other mechanisms connected to the accumulator.

It is understood that the foregoing description is merely illustrative of a preferred embodiment of the invention and that the scope of the invention is not to be limited thereto but is to be determined by the appended claims.

I claim:

1. An unloader valve assembly for a hydraulic system including a reservoir, a pump and an accumulator, said unloader valve assembly comprising a housing having a valve bore therein, a valve slidable in the bore and having opposite sides thereof of unequal effective area exposed to the fluid under pressure, means responsive to accumulator pressure for relieving the fluid pressure on the side of greatest effective area of said valve, said housing having a vent opening for the relieved fluid, and means for restricting the flow of fluid through said vent opening, said housing having a discharge opening for venting the fluid on the other side of said valve, the restricting means causing the greater portion of the relieved fluid to flow through the said discharge opening.

2. An unloader valve assembly for a hydraulic system including a reservoir, a pump and an accumlator, said unloader valve assembly comprising a housing having a valve bore therein, a valve slidable in the bore and having opposite sides thereof of unequal effective area exposed to the fluid under pressure, said valve having a restricted opening therethrough from one of said sides to the other, means successively responsive to pump and accumulator pressure for relieving the fluid pressure on the side of greatest effective area of said valve, said housing having a vent opening for the relieved fluid, and means for restricting the flow of fluid through said vent opening, said housing having a discharge opening for venting the fluid on the other side of said valve, the restricting means causing the greater portion of the relieved fluid to flow through the said discharge opening and the restricted opening through the valve causing a gradual restoration of pressure on the said side of greatest effective area of the slidable valve when the accumulator begins to charge.

3. An unloader valve assembly for a hydraulic system including a reservoir, a pump and an accumulator, said unloader valve assembly comprising a housing having a throughbore therein and a plurality of side openings connecting with the throughbore, one of said openings being connectible to said pump of the system, another being connectible to the accumulator and a third being connectible to the reservoir of the system, a pilot valve pin concentrically arranged in and with respect to said throughbore, a pressure responsive valve in hydraulic communication with the accumulator opening to limit the pressure in the accumulator opening, a vent valve concentrically arranged with respect to the pilot valve pin and interposed between the pump and reservoir openings, one end of the pilot valve pin being subject to the pressure of the fluid in the accumulator opening, said vent valve being exposed on opposite sides to pump pressure, one of said sides being of greater effective area than the other and said vent valve being hydraulically unbalanced thereby in a closing direction, a resiliently opposed valve responsive to pump pressure and adapted to be contacted and held open by the pilot valve pin, a fourth side opening in communication with the exhaust side of the resiliently opposed valve, said exhaust opening including a restricted passageway for metering the fluid exhausted by the resiliently opposed valve, whereby opening of the resiliently opposed valve effects a gradual unbalance of the vent valve in an opening direction thereby to prevent destructive hammering of the vent valve against the housing.

4. An unloader valve assembly for a hydraulic system including a reservoir, a pump and an accumulator, said unloader valve including an accumulator valve, a pilot valve and a vent valve, said vent valve comprising a cylinder having a recess therein and a central bore, said pilot valve comprising a resiliently biased ball and a pin extending through the central bore, there being clearance between the pilot valve pin and the bore such that both sides of the vent valve are subject to the same fluid pressure, the effective area of the side of the vent valve having the recess being greater than the effective area of the opposite side thereof such that the valve is unbalanced, a seat for the vent valve, the unbalance tending to hold the valve on its seat, a fixed seat concentrically arranged with respect to the ball and against which the ball is resiliently biased, said pilot valve pin extending through the accumulator valve and being responsive on one side to the pressure in the accumulator and on the other to the pressure in the recess, said ball being adapted to be contacted by the pilot valve pin to hold the ball off its seat against the action of said spring when the unit pressure in the recess falls below the unit pressure in the accumulator, the side of the vent valve having the greater effective pressure being in hydraulic communication with the ball such that when the ball is held off its seat, fluid acting upon said greater area is vented through said ball valve seat, said ball valve having a vent opening connected with the reservoir and a restricted passageway interposed between the ball and the vent opening such that when the pilot valve pin holds the ball off its seat, pressure on the side of the vent valve having the greater effective pressure is slowly reduced to prevent destructive hammer of the vent valve in an unloading direction.

5. An unloader valve as descried in claim 4, said abutment comprising a plug extending into the recess in the vent valve, said plug having a central opening therein, said seat for the ball being formed on the interior of the opening, in the plug, and abutment in the opening in the plug, a spring providing the resilient bias for the ball, said abutment being adapted to take the reaction of the spring, and means for adjusting the axial position of the abutment for said spring in the bore whereby to adjust the pressure at which the ball will be unseated and the vent valve will open.

6. A hydraulic system including a pair of pressure differential operated motors, an accumulator of fluid under pressure, a reservoir of fluid, a pump connected to the reservoir and to the accumulator and adapted to supply fluid under pressure to the accumulator, an unloader valve connected to the output of the pump and controlling the input to the accumulator, said unloader valve having a vent opening through which fluid is discharged when the pressure in the accumulator reaches a predetermined value, a normally open valve connected to the vent opening, a normally closed valve connected to the accumulator, said normally open valve being connected to and controlling the operation of one of the motors, and the normally closed valve being connected to and controlling the operation of the other of said motors.

7. A hydraulic system including at least a pair of work cylinders of the reciprocating type, an accumulator, a reservoir of fluid, a pump connectible with the reservoir for supplying fluid under pressure to the accumulator, an unloader valve connected to the output of the pump and controlling the input to the accumulator, said unloader valve having a vent opening for discharging fluid from the pump when the accumulator is satisfied, an open center valve connected to the vent opening of the unloader valve and controlling the application of fluid therefrom to one of said work cylinders, and a closed center valve connected to the accumulator and controlling application of fluid under pressure from said accumulator to another of said work cylinders.

8. A hydraulic system including a pair of pressure differential operated motors, an accumulator of fluid under pressure, a reservoir of fluid, a pump connected to the reservoir and to the accumulator and adapted to supply fluid under pressure to the accumulator, an unloader valve assembly connected to the output of the pump and controlling the input to the accumulator, said unloader valve assembly comprising a housing having a valve bore therein, a valve slidable in the bore and having opposite sides thereof of unequal effective area exposed to the fluid under pressure, means successively responsive to the pump pressure and to the accumulator pressure for relieving the fluid pressure on the side of greatest effective area of said slidable valve, said housing having a vent opening for the relieved fluid, and means for restricting the flow of fluid through said vent opening, said housing having a discharge opening for venting the fluid on the other side of said valve, the restricting means causing the greater portion of the relieved fluid to flow through the said discharge opening; a normally open valve connected to the discharge opening of the unloader valve, a normally closed valve connected to the accumulator, means conducting fluid from the vent opening to the reservoir, said normally open valve being connected to and controlling the operation of one of the motors and the normally closed valve being connected to and controlling the operation of the other of said motors.

References Cited in the file of this patent
UNITED STATES PATENTS

| | | |
|---|---|---|
| 2,275,963 | Herman et al. | Mar. 10, 1942 |
| 2,345,531 | De Ganahl | Mar. 28, 1944 |
| 2,513,681 | Schultz | July 4, 1950 |